Patented Sept. 22, 1942

2,296,406

UNITED STATES PATENT OFFICE 2,296,406

METHOD OF PREPARING CATALYST

William E. Spicer and Rhea N. Watts, Baton Rouge, La., assignors to Standard Oil Development Company, a corporation of Delaware No Drawing. Application July 25, 1940, Serial No. 347,488

12 Claims. (Cl. 252—251)

This invention relates to catalysts for use in catalytic reforming and is more particularly concerned with improved methods of preparing the same.

The term "catalytic reforming" wherever used in the specification and claims shall be understood to mean any process of subjecting materials consisting essentially of hydrocarbons substantially boiling in the gasoline range to heat treatment at a temperature in excess of 500° F. and in the presence of catalysts to produce a dehydrogenated or otherwise chemically reconstructed product, for example of anti-knock characteristics superior to those of the starting material, with or without an accompanying change in molecular weight or volatility. By the term "chemically reconstructed" is meant something more than the mere removal of impurities or ordinary finishing treatments. The term catalytic reforming shall be understood to include but not by way of limitation reactions such as dehydrogenation, aromatization or cyclization, desulfurization, alkylation and isomerization, all or some of which may occur to a greater or lesser extent during the process.

The term "catalytic reforming in the presence of hydrogen" wherever used in the specification and claims shall be understood to mean a process of catalytic reforming carried out in the presence of substantial amounts of added or recirculated hydrogen or gases rich in free hydrogen under conditions such that there is either no net consumption of free hydrogen or there is a net production of free hydrogen and in which the oil feed rate, the total pressure and the volume of hydrogen are adjusted vis-a-vis one another so that the partial pressure of hydrogen will be below about 20 atmospheres.

Catalytic reforming and catalytic reforming in the presence of hydrogen are especially useful for preparing internal combustion engine fuels which are characterized by high octane number, high lead susceptibility and other desirable characteristics. A typical process of catalytic reforming is one in which a light naphtha or a heavy naphtha is passed over a catalyst consisting of aluminum oxide and a VI group metal oxide at a temperature between 850 and 1050° F., under a pressure between slightly above atmospheric and about 600 pounds per square inch and at a rate between 0.5 and 5.0 volumes of liquid oil per volume of catalyst per hour. When carried out in the presence of hydrogen, substantially the same conditions may be used but in addition from 500 to 10,000 cubic feet of gas per barrel of oil accompany the oil through the reaction zone and this gas preferably contains between 20 and 90 mol per cent of free hydrogen. In this latter case, the hydrogen initially added and that produced in the reaction may be continuously recirculated so that after once having started up it is not necessary to add hydrogen from an extraneous source.

The flow of oil or oil and hydrogen through the reaction zone is continued in each case until the catalyst has lost its activity to such an extent that it is uneconomical or undesirable from the standpoint of the improvement obtained to continue any further. In catalytic reforming this point may be reached in from 1 to 3 hours. In catalytic reforming in the presence of hydrogen this point may not be reached until after 6 or even 20 or more hours. The loss of activity in each case is believed to be due primarily to the deposition or formation on the catalyst of carbonaceous contaminants such as tarry matter and coke. The activity of the catalyst can be restored by periodic regeneration treatments, the principal effect of which is to remove carbonaceous contaminants. The type of catalyst mentioned above, i. e. one consisting of aluminum oxide and a VI group metal oxide can be regenerated readily by passing hot inert gases containing regulated small quantities of air or oxygen through the catalyst mass whereby the carbonaceous material is removed by combustion.

It has been known for some time that materials comprising aluminum oxide and smaller amounts of other metal oxides are characterized by appreciable activity in promoting the dehydrogenation of hydrocarbons. However, until recently it was always considered essential to use an "activated alumina" as a starting material for the preparation of such catalysts because activated alumina has a substantially greater adsorptive capacity for gases than other forms of alumina and in addition has certain other physical and surface characteristics which were deemed necessary for the preparation of an active catalyst. More recently it has been found that highly active catalysts of this type can be prepared when using ordinary commercial crystalline aluminum hydrates as a starting material. There are three hydrates of alumina, the monohydrate ($Al_2O_3.H_2O$), the dihydrate ($Al_2O_3.2H_2O$) and the trihydrate ($Al_2O_3.3H_2O$). The commonest one is the trihydrate and it is obtained as a by-product in many industrial processes such as the refining of chromium from its ores. In addition to being available in large quantities, the aluminum hydrates have two important advantages over activated alumina as the starting material for the preparation of catalysts to be used in catalytic reforming, to wit, (1) catalysts of even greater activity can be prepared from the aluminum hydrates than from the activated alumina, and (2) the aluminum hydrates are very much cheaper than activated alumina, costing from 3 to 5 cents a pound as compared to 15 to 20 cents a pound for activated alumina.

There are several methods for preparing catalysts containing aluminum oxide for use in catalytic reforming. One method is to impregnate lumps of aluminum oxide with a solution of a metal compound, dry and heat to convert the metal compound to the oxide. Another method is to reduce the aluminum oxide to a finely divided state, impregnate the powder with a solution of a metal compound to form a paste of suitable consistency and then to mold the paste into small pills or tablets in a pilling machine, following which the pills may be dried and heated to convert the metal compound to the oxide. A third method is to reduce the aluminum oxide to a finely divided state, impregnate the powder with a solution of a metal compound to form a paste of suitable consistency and then to extrude the paste into long ribbons, rods or worm-like strands in an extrusion machine, following which the long ribbons may be cut into short lengths and the pieces dried and heated.

When only small quantities of catalyst are required as for experimental work in a laboratory, it makes little difference which of the three methods is used. However, in commercial scale plants for catalytic reforming and catalytic reforming in the presence of hydrogen where large quantities of catalyst are required, the cost of preparing the catalyst is an important item and the ruggedness of the catalyst must be sufficient to permit large masses of catalyst to be packed into a reaction chamber without having the lumps or pieces crumble. In preparing large batches of catalyst the third of the three methods mentioned above, namely extrusion, is by far the cheapest and fastest method.

We have observed however that crystalline aluminum hydrates are not particularly adapted to either the pilling or the extrusion methods because the paste appears to lack the necessary cohesiveness to make a non-crumbling, rugged catalyst.

It is a particular object of the present invention to provide a means for preparing catalysts for catalytic reforming and catalytic reforming in the presence of hydrogen from crystalline aluminum hydrate as a starting material using the pilling or extrusion method whereby the product obtained will be active and rugged.

It is also an object of the invention to prepare a highly active catalyst for catalytic reforming and catalytic reforming in the presence of hydrogen using cheap, commercial aluminum hydrates as the starting material.

According to the invention, the improved catalysts are prepared essentially as follows: a commercial crystalline aluminum hydrate, for example the trihydrate obtained as a by-product in the refining of chromium ores is impregnated with a solution of a compound of a metal of the VI group of the periodic system, for example, a water soluble compound of molybdenum, chromium, tungsten or uranium and then to the paste thus formed a peptizing agent is added and the mixture thoroughly kneaded or mixed for a period of ½ to 1 hour or more. The peptizing agent may be an organic or inorganic acid capable of peptizing aluminum hydrate. Examples of such acids are trichloracetic acid, dichloracetic acid, nitric acid, hydrochloric acid, monochloracetic acid, formic acid, acetic acid, oxalic acid, tartaric acid or sulfuric acid. The peptizing of the impregnated mass appears to increase its viscosity and cohesive characteristics so that upon subsequent pilling or extruding, drying and heating pieces of substantial ruggedness and crushing strength are obtained. Following thorough kneading with the peptizing agent, the paste is introduced into a pilling or extruding machine and molded into pills or tablets on the one hand, or extruded in long solid spaghetti-like ribbons, on the other. The long ribbons of extruded material may be cut into short lengths, say from ⅛ to ½ inch long. The pilled or extruded pieces are then dried with steam for a period of 5 to 10 hours following which they are heated to a temperature of about 1200° F. and held at this temperature until the volatile content as determined at 1600° F. has been reduced to 1–15% of the weight of the heated mass. The dried and heated pieces are then ready for use as catalysts. In determining the optimum content of volatile matter in the catalyst, it is necessary to strike a balance between the initial activity and the physical strength of the catalyst. Catalysts having a low moisture content have the best initial activity but must be handled very carefully to avoid physical disintegration of the pieces. On the other hand, catalysts with a high moisture content are quite rugged and may be handled without much loss from disintegration to powder but their initial activity is lower. The activity of the catalyst is observed gradually to increase as the volatile content is reduced during the reforming operation and during regeneration and may eventually reach the same activity as a catalyst having an initially low volatile content. For this reason it is frequently desirable to charge a catalyst of high volatile content to the reaction chamber in order to take advantage of the greater ruggedness of such a catalyst and then to heat the mass in the reaction chamber before any oil is introduced until the volatile content has been reduced to a level at which the activity of the catalyst is up to the desired point.

It will be understood of course that if the catalyst is to be used in finely divided form suspended in the vapors of oil or oil and hydrogen, it is not necessary to pill or extrude the paste. Even in such cases, however, it is desirable to subject the paste to peptizing because a more active catalyst is obtained thereby.

The quantity of VI group metal oxide with which the aluminum hydrate is impregnated should preferably be between about 2 and 20 per cent by weight. Molybdenum oxide is the preferred metal oxide although satisfactory results are also obtained with the other VI group metal oxides.

A catalyst containing molybdenum oxide is prepared according to the improved method in the following manner:

Approximately 387 gallons of distilled water are pumped into a suitable agitator or mixer. About 1790 pounds of 26° Bé. ammonia water are added and thoroughly mixed. Next about 2100 pounds of molybdenum oxide are added slowly and with constant stirring and care is taken not to allow the temperature to rise much above 140° F. in order to avoid loss of ammonia. The solution of ammonium molybdate thus formed is cooled to about 50 to 80° F.

About two hundred pounds of commercial crystalline aluminum hydrate are placed in another suitable mixing device. To this mixer is added an amount of the previously prepared ammonium molybdate solution which will be equivalent to about 14 pounds of molybdenum oxide. The mixture is thoroughly kneaded for a period of about 15 minutes and then about 4170 cc. of 99% acetic is added and the kneading continued for another 30 minutes. Glacial acetic acid and dilute acetic acid are equally satisfactory for use as the peptizing agent although glacial acetic acid has the advantage of avoiding an increase in the moisture content of the catalyst. The paste is then taken out of the mixer and put through a pilling or extruding machine. If the paste is not of the proper consistency for pilling or extrusion, distilled water may be added to it. After pilling or extrusion the pellets are dried with steam for a period of 5 to 10 hours. Thereafter they are preferably screened to remove all fines. The fines may be returned to the mixer and repilled or re-extruded. Following the drying with steam, the pellets are subjected to an activation treatment which consists in heating them in an electric muffle furnace or other suitable device to a temperature of about 1200° F. and holding them at this temperature for about 1 to 2 hours. The pellets are then ready for use.

There are several modifications which may be made within the scope of this invention in the preparation of catalysts for catalytic reforming and catalytic reforming in the presence of hydrogen.

One especially useful modification is applicable in cases where a large supply of cheap non-hydrated aluminum oxide is available for use as the starting material. Ordinarily non-hydrated aluminas are not capable of being peptized by organic acids such as acetic acid. In addition they are very difficult to pill or extrude. We have found that if a relatively small amount, say from 10 to 30% of crystalline aluminum hydrate is incorporated with the non-hydrated alumina, the crystalline aluminum hydrate may be readily peptized with organic acids and the resulting paste forms a lubricant and binder for the non-hydrated alumina and the whole may be pilled or extruded to form rugged, active catalysts. The same general procedure may be used as described above.

Another modification of the method consists in effecting peptization and formation of the paste into pellets or balls simultaneously. In the above description it has been pointed out that after the aluminum hydrate has been peptized with acetic acid it is introduced into a pilling or extruding machine after adding distilled water if necessary to obtain the required consistency. We have found, however, that if the peptized mass is allowed to remain in the kneading or mixing device until it becomes plastic, small spherical pellets will begin to form in the mixer and these pellets gradually become larger and larger. When the pellets have grown to the desired size, a small amount of dry, powdered aluminum hydrate or recycled dried catalyst powder is added to the mixer and the mixing is continued until the pellets become firm and polished on the surface. Thus by this modification it will be seen that pellets of suitable size and characteristics may be obtained without having to use a pilling or extruding machine. Following the formation of the pellets in this manner, they are dried and heated in the same manner as previously described. This method is applicable not only to aluminum hydrates but also to non-peptizable aluminas to which a small amount of aluminum hydrate has been added.

In all of the above described procedures, the impregnation of the alumina with the solution of the VI group metal compound may either precede or follow the preparation of the pellets, that is the solution of metal compound may be added before or during the peptizing or the dried pellets may be impregnated with said solution. Two or more different metal compounds may also be deposited on the pellets and built up in layers to form what is called a "sandwich" type catalyst.

This invention is not limited by any theories or any details which have been given merely for purposes of illustration but is limited only in and by the following claims in which it is intended to claim all novelty inherent in the invention.

We claim:

1. The method of preparing a rugged, active catalyst for use in catalytic reforming which comprises adding an acid having peptizing characteristics therefor to a crystalline aluminum hydrate, kneading the mixture to peptize the hydrate and form a paste, molding the paste by mechanical means into pellets of suitable size, drying the pellets with steam, heating the dried pellets to a temperature of about 1200° F. to reduce the volatile content thereof, and incorporating with the pellets at some point during the preparation of the pellets before the heating step a compound of a metal of the VI group of the periodic system.

2. The method of preparing a rugged, active catalyst for use in catalytic reforming which comprises intimately mixing a crystalline aluminum hydrate with a solution of a compound of a metal of the VI group of the periodic system, adding to this mixture an acid capable of peptizing the aluminum hydrate, kneading the mass to peptize the hydrate and form a paste of a consistency suitable for mechanical molding, molding the paste by mechanical means into pellets of suitable size, drying the pellets with steam, and heating the dried pellets to a temperature of about 1200° F. until the volatile content as determined at 1600° F. has been reduced to 1–15% by weight of the pellets.

3. The method of preparing a rugged, active catalyst for use in catalytic reforming which comprises adding an organic acid of the type of acetic acid to a crystalline aluminum hydrate, kneading the mixture to peptize the hydrate and form a paste of a consistency suitable for mechanical molding thereof, molding the paste by mechanical means into pellets of suitable size, drying the pellets with steam, impregnating the dried pellets with a solution of a compound of a metal of the VI group of the periodic system, and heating the impregnated pellets to a temperature of about 1200° F. until the volatile content as determined at 1600° F. has been reduced to 1–15% by weight of the pellets.

4. Method according to claim 2 in which the organic acid is acetic acid.

5. Method according to claim 2 in which the quantity of solution of a compound of a metal of the VI group which is added to the crystalline aluminum hydrate is such that the pellets ultimately obtained will contain from 2 to 20 per cent. by weight of the oxide of said metal.

6. Method according to claim 3 in which the quantity of solution of a compound of a metal of the VI group with which the pellets are impregnated is such that the amount of metal oxide on the finished pellets will be between 2 and 20 per cent by weight.

7. The method of preparing a rugged, active catalyst for use in catalytic reforming which comprises adding an acid having peptizing characteristics therefor to a crystalline aluminum hydrate in quantities sufficient to peptize said aluminum hydrate, kneading the mixture in a suitable mixing device until spherical pellets of the size desired are formed, adding a dry, powdered aluminum oxide containing material to the moist mass undergoing kneading in quantities sufficient to coat the spherical pellets with said dry aluminum hydrate, drying the pellets so obtained with steam, heating the dried pellets to a temperature of about 1200° F. until the volatile content as determined at 1600° F. has been reduced to 1-15% by weight of the pellets, and incorporating with the aluminum hydrate at some point during the preparation prior to the heating step a solution of a compound of a metal of the VI group of the periodic system.

8. Method according to claim 7 in which the solution of the metal compounds is added to the mixture of alumium hydrate and peptizing acid while the latter is being kneaded.

9. Method according to claim 7 in which the dry, powdered aluminum oxide containing material added to the paste comprises fines formed in the subsequent molding and heating of the paste.

10. Method according to claim 7 in which the pellets are impregnated with the solution of the metal compound after they have been removed from the kneading means but before they are dried and heated.

11. The method of preparing a rugged active catalyst for use in catalytic reforming which comprises mixing a non-peptizable type of aluminum oxide with from 10 to 30 percent. by weight of a crystalline aluminum hydrate, adding to this mixture a solution of a compound of a metal of the VI group of the periodic system and acetic acid, kneading the mixture to peptize the aluminum hydrate and to form a paste of such consistency that the mixture can be molded by mechanical means, molding the paste into pellets of suitable size by mechanical means, drying the pellets so formed with steam, and heating the dried pellets to a temperature of about 1200° F. until the volatile content as determined at 1600° F. has been reduced to 1-15% by weight of the pellets.

12. The method of preparing a rugged, active catalyst for use in catalytic reforming in the presence of hydrogen which comprises intimately commingling crystalline aluminum trihydrate with a solution of ammonium molybdate, adding to the mixture glacial acetic acid, kneading the mass for a time sufficient to peptize the aluminum trihydrate and to form a paste of such consistency that it can be molded by mechanical means, extruding the paste through an extruding means, cutting the extruded mass into pieces of suitable length, drying the pieces so obtained with steam, and heating said pieces to a temperature of about 1200° F. until the volatile content as determined at 1600° F. has been reduced to 1-15% by weight of the pellets.

WILLIAM E. SPICER.
RHEA N. WATTS.